United States Patent [19]

Rudy et al.

[11] 4,249,821

[45] Feb. 10, 1981

[54] BELT MICROFILM CAMERA

[75] Inventors: Michael W. Rudy, Thousand Oaks; Forrest L. Langford, Northridge; Robert D. Therien, Newbury Park, all of Calif.

[73] Assignee: Terminal Data Corporation, Woodland Hills, Calif.

[21] Appl. No.: 50,731

[22] Filed: Jun. 21, 1979

[51] Int. Cl.³ .................. G03B 27/32; G03B 27/60
[52] U.S. Cl. .................................. 355/64; 355/71; 355/73
[58] Field of Search .............. 355/64, 65, 53, 72–74, 355/71; 318/696; 226/95, 170, 171, 172; 242/182–185

[56] References Cited

U.S. PATENT DOCUMENTS

| | | |
|---|---|---|
| 3,007,368 | 11/1961 | Rosenblum . |
| 3,197,645 | 7/1965 | Sperry .................. 250/219 |
| 3,339,815 | 9/1967 | Fredkin .................. 226/2 |
| 3,645,619 | 2/1972 | Burton et al. .............. 355/64 X |
| 3,767,302 | 10/1973 | Roberts et al. ............ 355/53 |
| 3,844,461 | 10/1974 | Robison et al. ........... 355/73 X |
| 4,007,889 | 2/1977 | Langford .................. 242/199 |
| 4,042,298 | 8/1977 | Herrmann ................. 355/65 X |

Primary Examiner—L. T. Hix
Assistant Examiner—W. J. Brady
Attorney, Agent, or Firm—Harry R. Lubcke

[57] ABSTRACT

A microfilm camera, typically for 16 mm film, having plural coplanar friction-driven belts. The film is held to the belts by vacuum, so that the film and the belts move together.

Vacuum film-loop chambers allow accurate low-inertia control of the film positioning for exposure.

An intermittently rotatable shutter may be provided for appropriate exposure of the desired image upon the film.

Programmable logic receives data from plural sensors and its controls drive means to correlate significant film movement and stationary periods with the functioning of opto-mechanical elements for exposing the film while it is stationary.

18 Claims, 10 Drawing Figures

BELT MICROFILM CAMERA

BACKGROUND OF THE INVENTION

This invention pertains to microfilm cameras having a electronic logic elements for correlating operation.

U.S. Pat. No. 3,007,368, to Rosenblum in 1961, discloses only a vacuum platen. Film is moved across the platen by other means and only when an exposure is to be made is vacuum applied, thus stopping and flattening the film. This is important for the large film used for aerial photography illustrated by Rosenblum.

U.S. Pat. No. 3,339,815, to Fredkin in 1967, discloses a computer-controlled film indexing device for high speed film reading or recording, typically of an image upon a cathode-ray tube. Stepper motors are computer controlled.

U.S. Pat. No. 4,007,889, to Langford in 1977, discloses an all-mechanical film flow camera in which the film is moved by an intermittently operated capstan, to record an image while the film is moving.

U.S. Pat. No. 3,197,645, to Sperry in 1965, discloses a loop-sensing apparatus in which photoelectric means act as sensors to determine the length of a film loop in a chamber and provide data for the control of the length thereof.

U.S. Pat. No. 3,767,302, to Roberts et al in 1973, discloses principally a wide-film microfiche camera having a vacuum platen and air blow-off for film movement, only one film loop chamber, and microprocessor control of the opto-mechanical element

BRIEF SUMMARY OF THE INVENTION

Rather than employing the known Geneva movement or the known claw movement for obtaining intermittent transport of film with sprockets and sprocket holes for the exposure of motion picture film while stationary, the present invention holds the film to intermittently translated plural belts.

Plural continuous flexible belts are translated in front of a perforated vacuum platen. The initially unexposed film is retained to the belts by the vacuum.

The belts move in unison in parallel planes between two pulleys, being friction driven by one of the pulleys.

By means of plural logic-controlled prime movers the film is fed to the belts, translated by the belts by vacuum adhesion between exposures, stopped for each exposure, and collected in a take-up magazine.

Vacuum controlled film loop chambers on each side of the belt drive supply and remove the film without imposing mechanical forces upon the belt drive.

Optionally, an intermittently rotated shutter can be provided and integrated into the logic control system.

Logic-controlled stepper motors are typically employed for driving the belts and the shutter. D.C. motors are typically employed for supplying and reeling the film. Sensors in the film loop vacuum chambers provide informational inputs to the logic, which then controls the d.c. motors.

BRIEF DESCRIPTION OF THE DRAWINGS

FIG. 5 is a front elevation detail of the shutter and sensor, and indicating the partial section for FIG. 1, along line 1—1. FIG. 5 is a breakaway view, with the belts and motor structures being shown in phantom.

DESCRIPTION OF THE PREFERRED EMBODIMENTS

Figure 1:
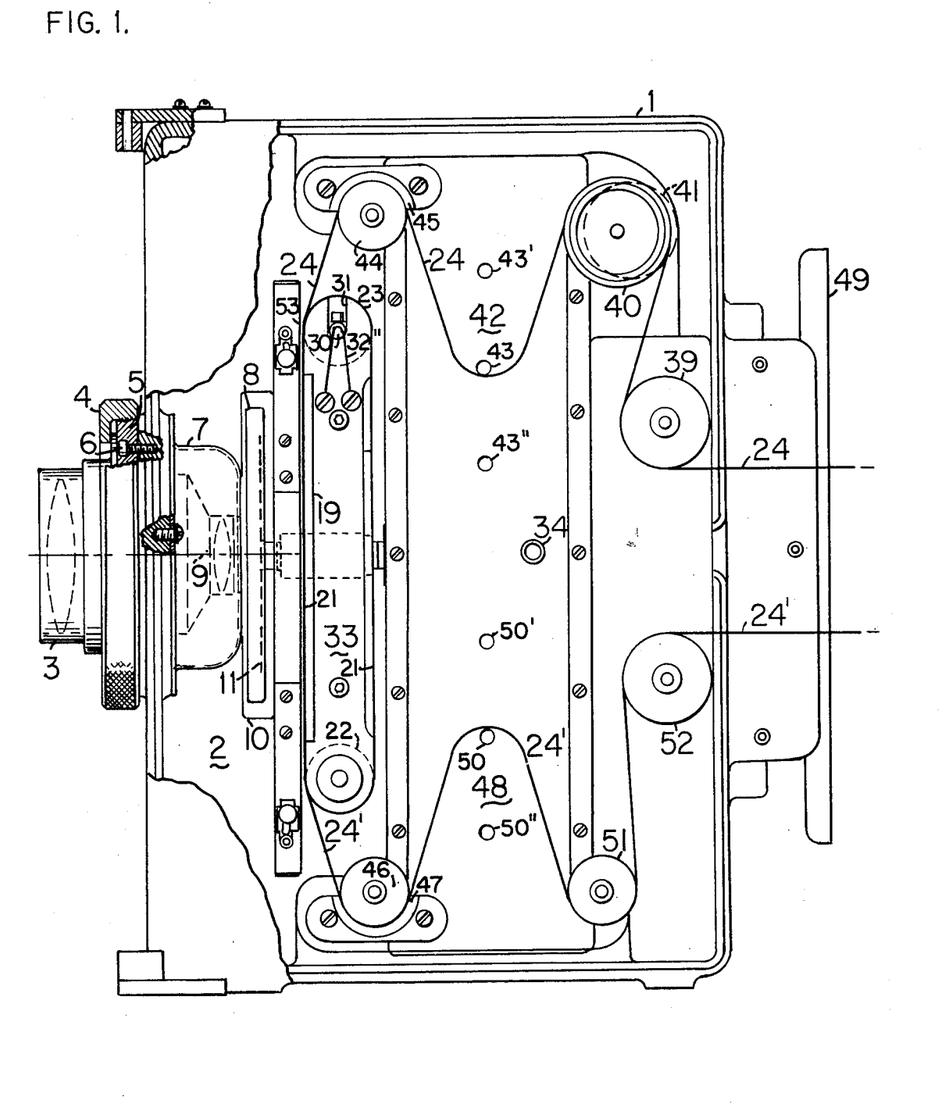
FIG. 1 shows a forward side elevation of the microfilm camera. The covers are removed and it is partly in section.
Figure 4:
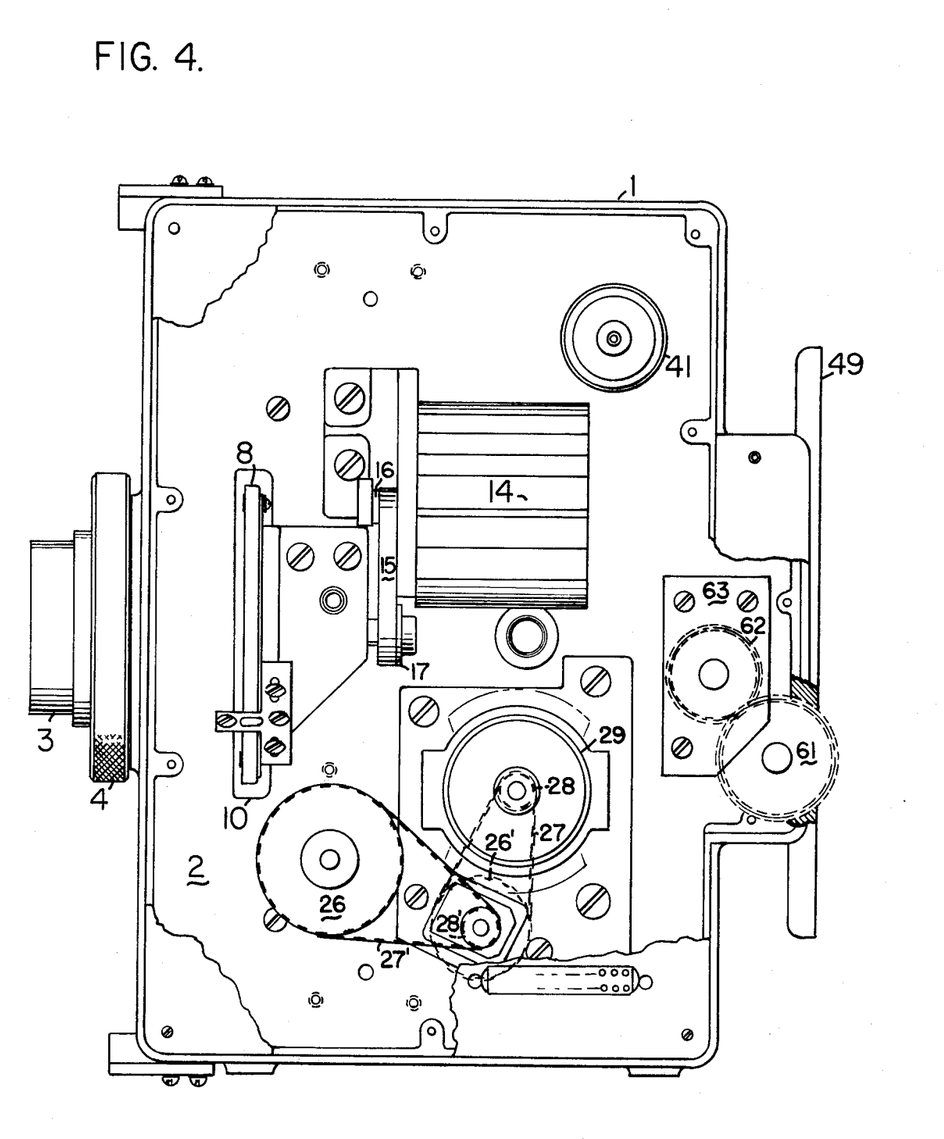
FIG. 4 is a rear side elevation of the microfilm camera, with the covers removed, rib 2 being in phantom.

In FIGS. 1 and 4, numeral 1 indicates the light-tight containing case of the belt microfilm camera. It is typically cast of aluminum. It is a precision structural part of the camera, as is a centrally disposed rib 2, which rib carries most of the mechanical mechanism.

Objective lens 3, of photographic quality, may have a focal length of 66 millimeters (mm) and a speed of f 5.6. This is for exposing 16 mm film in the camera, which is typical. Of course, the camera according to this invention can be constructed to handle any width of long strip film, such as 35 mm, 70 mm, etc.

Lens focusing is preferably resident in the lens structure. Threaded ring 4 clamps the ring on the lens barrel, which latter ring is provided for mounting the lens. Inner threaded ring 5 provides support to the case for ring 4, and is, in turn, fastened to the case by plural cap screws, one of which, 6, is shown in the sectioned part of the figure.

Internal cylindrical light shield 7 protects the rear of lens 3.

When a shutter is employed, cylindrical rotary shutter housing is next in line long optical axis 9. The shutter is mounted within housing 8. A cut-out 10 in rib 2 allows the housing to be disposed such that the shutter blade intercepts the image-forming light rays centered upon optical axis 9.

Figure 5:
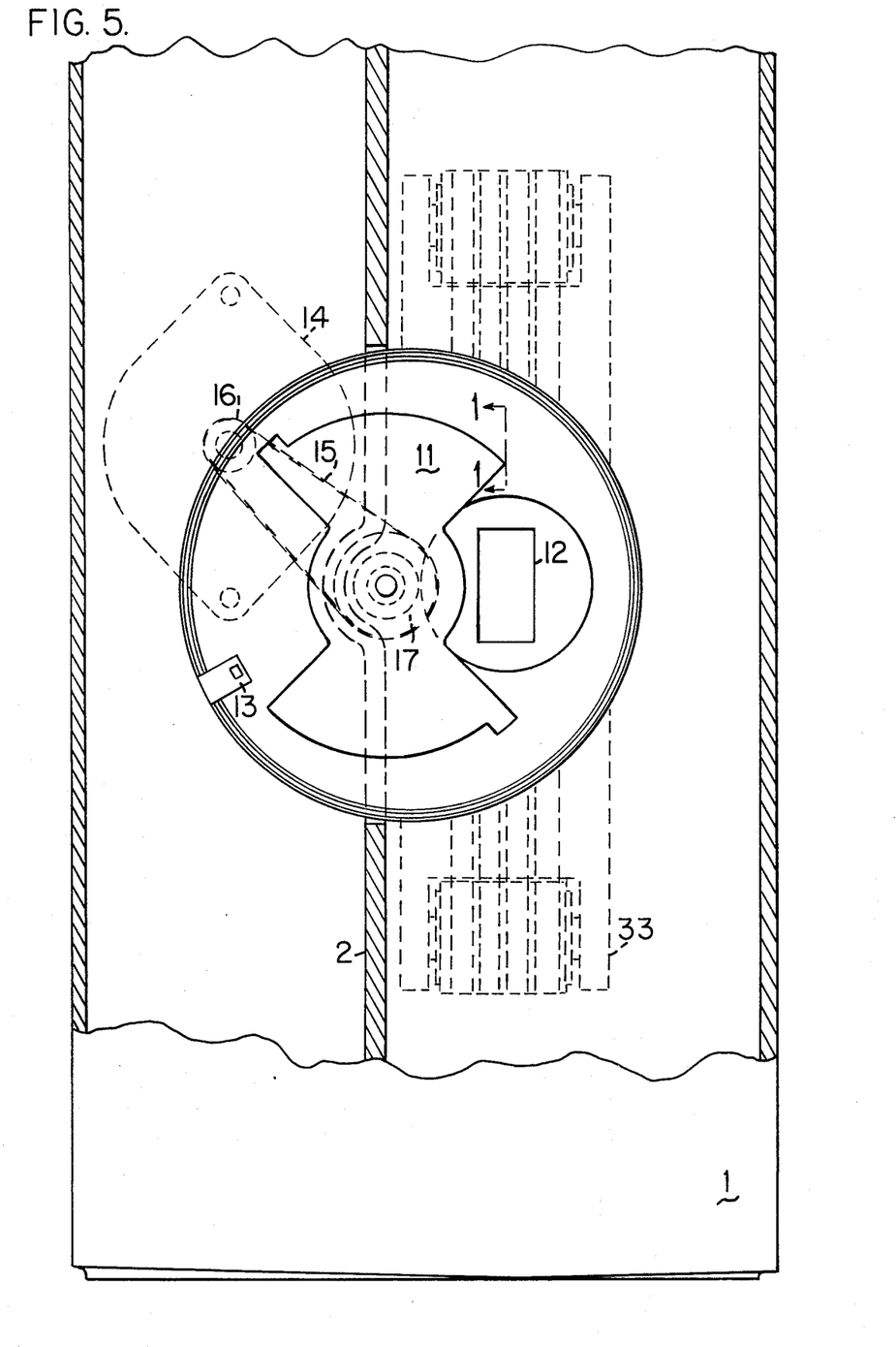

Preferred rotatable shutter 11 is disposed within housing 8 such that a substantially vertical wipe is accomplished by the shutter in moving across optical image aperture 12. The shutter (blade) has an "hourglass" shape. Two openings and closings of the optical path are accomplished for one revolution of the shutter. Stepper-motor 14 is positioned above and on the side opposite image aperture 12. It is connected to the shutter by toothed belt 15, which runs over motor pulley 16 and larger shutter pulley 17. The speed reduction is 2 to 1.

Alternatively, the shutter blade may be formed to have one or more than two occultations of the image aperture per revolution, a servo motor may be employed, and the motor may be a direct or gear drive to the shutter.

Shutter sensor 13 gives an "open" or "closed" indication.

Figure 3:
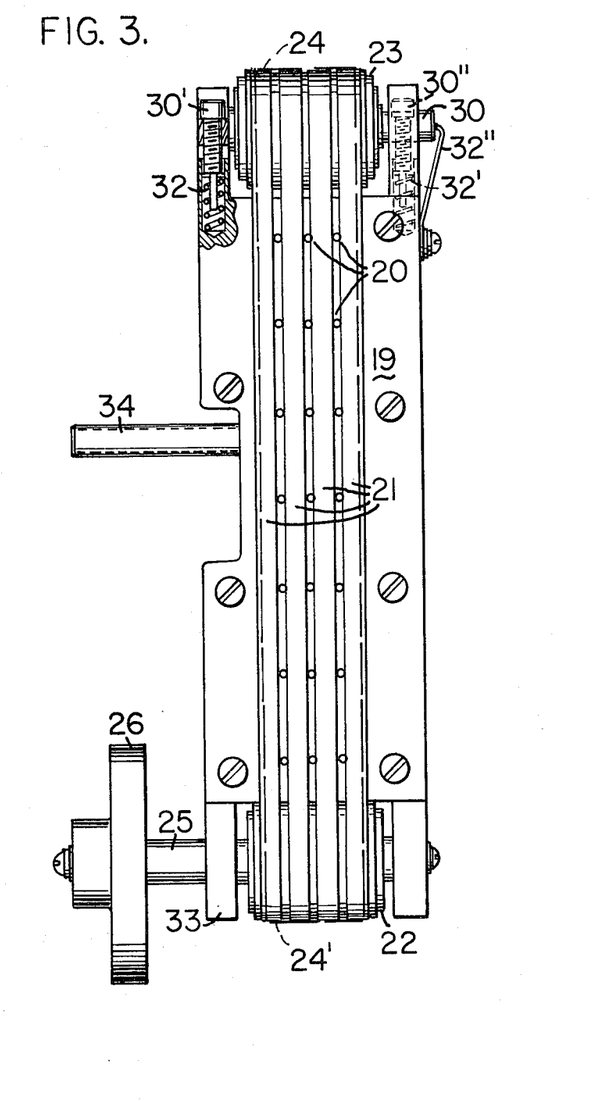
FIG. 3 is a front elevation detail of the vacuum platen, plural belts, and the film.

Vacuum platen 19 is shown edge-on in FIG. 1 and front-faced in FIG. 3. The platen is provided with a relatively large number of small apertures 20, say 21 apertures. These are spaced laterally between plural coplanar endless flexible belts 21. Four such belts are suitable, as shown.

The belts, in turn, are stretched between drive pulley 22 and second pulley 23. The distance between the pulleys may be six times the height of image aperture 12. Film 24, typically of 16 mm width and without sprocket holes, is shown dashed in FIG. 3. It covers substantially all of the plural belts. The film and the belts are held to the platen by a vacuum maintained in a chamber behind the platen. The front (emulsion) surface of film 24 lies in the image plane of lens 3.

Drive pulley 22 is mounted upon shaft 25. The shaft is journaled at each side of the pulley, preferably in ball bearings. Shaft 25 carries external drive pulley 26 at one side. This typically carries toothed belt 27'. Belt 27 runs over small motor pulley 28 of stepper motor 29. The speed reduction ratio is chosen in relation to the diameter of belt drive pulley 22 to obtain a preferred film pull-down increment, typically 0.25 mm, for each motor step. Elements 26,27 & 28 are drive means. Belt pulleys 26' and 28' constitute an intermediate idler.

Carriage frame 33 supports platen 19 and has the form of a hollow parallelepiped, thus suited to maintain a vacuum behind the platen. Tube 34 connects to this hollow vacuum chamber, allowing connection to a flexible hose and a vacuum pump, both not shown.

The vacuum is constantly maintained. A film stepper motor acts to provide necessary intermittent motion of the belts, and thus of the film. Note that it is not necessary to blow the film away from the vacuum platen to prevent scratching during the motion of the film, and then to reapply the vacuum before exposing the film. Belts 21 and film 24 are in constant fixed contact as long as these elements traverse vacuum platen 19.

Film keeper plate 53 is disposed in a plane that is parallel to the path of film 24, 24', and is spaced approximately one millimeter in front of the film. The keeper plate is substantially coextensive with belts 21 in the forward run thereof, save for an aperture in the plate at the location where lens 3 forms an image of the subject matter that is being microfilmed upon unexposed film 24.

The function of the film keeper plate is auxiliary to the basic operation of the camera. It is merely to retain film 24 near vacuum platen 19 at such times as the camera is not in operation and a vacuum is not maintained behind the platen. When operation of the camera is resumed the vacuum draws the film away from the keeper plate, which then does not touch the film during operation. This prevents possible scratches on the film.

Upper shaft 30, which supports driven pulley 23, is nested in slot 31, and is provided with two compression springs 32 and 32', which urge shaft 30 away from driven pulley 22. This keeps belts 21 taut. Hairpin spring 32" exerts inward pressure on shaft 30. This retains pulley 23 aligned with pulley 22. The springs are resilient means. Bolts 30' and 30", fastened to shaft 30, bear upon the springs.

Belts 21 are continuous and of uniform thickness so that the focal plane location of film 24 shall be preserved. A polyimide or polyester film belt is suitable; having a relatively high degree of flexibility, which includes a small stretch factor.

Pulleys 22 and 23 have crowned peripheral surfaces equal in number to the number of belts. In the present embodiment this is four. As is known, such a crowned surface causes a belt to run in a constant lateral position. This is desirable in this application. Vacuum apertures 20 are spaced between the belts, as has been mentioned, and as shown in FIG. 3.

Pulley 22 is preferably journaled by ball bearings upon shaft 25 that are stationarily supported by bores in carriage frame 33. Pulley 23 is preferably journaled by ball bearings mounted internally of the pulley and stationarily supported by shaft 30. With this construction pulleys 22 and 23 are disposed so that lateral play is essentially eliminated, thus precisely laterally placing film 24.

Unexposed film is contained in supply magazine 35, upon spool 36. The film, 24, passes therefrom via two light-baffle rollers 37 and 38, successively, then over idler roller 39 to capstan 40. The capstan is driven by motor 41, which is located on the rear side of partition 2, and is suitably controlled by the logic of the camera. A spring-loaded roller arm 36' externally indicates the amount of film available.

The film next moves into the upper vacuum column film loop chamber 42. The purpose is to obtain mechanical decoupling between the film supply mechanism, above described, and the belts vacuum adhesion drive, so that any unevenness in the film supply will not influence the placement of the film for optical exposure.

More nearly complete mechanical decoupling is obtained by using vacuum column film loops than is obtained by using known "dancer arms". This is because the effective inertia of a film loop alone is small in relation to the inertia of a dancer arm and the required pulley-roller.

In chamber 42 (FIG. 1) there are three vacuum ports, 43, 43' and 43". Central port 43 is employed to give a sensor input to the logic of the camera. The logic then gives a control signals to turn capstan motor 41 on or off, thereby to keep the size of the loop of film 24 substantially constant.

Upper port 43' and lower port 43" are for safety control; should the loop of film become abnormally too short or too long, the camera logic inhibits further operation of the camera.

The unexposed film then proceeds to upper idler roller 44. This positions the film so that it can enter the platen-belts domain. Roller assembly 44 is adjacent to a silicon carbide hard (as "Carboloy") film edge guide 45. Roller 44 is tapered to drive film 24 against this edge guide.

The film then passes to the upper end of the belts 21 structure and is vacuum-adhered to the belts, as has been stated. It is photographically exposed at each frame, while stationary, at the center of the belt traverse, and emerges as film 24'. The prime designation indicates exposed rather than unexposed film. It then passes to and around lower idler roller 46 for passage into lower vacuum chamber 48. The roller 46 assembly has a silicon carbide film edge guide 47, as did the roller 44 assembly.

Lower vacuum chamber 48 has three ports 50, 50' and 50". These serve the same control purpose for lower film loop 24' as ports 43, 43' and 43" do for the upper film loop. Central port 50 gives a sensor input, in combination with a pressure sensitive transducer, to the camera logic. This turns take-up motor 63 "on" or "off", to keep the size of film loop 24' substantially constant.

Second lower idler film roller 51 accepts film 24' from the lower vacuum chamber 48 and changes the direction of the film to pass vertically upward to third lower idler film roller 52. From thence the film moves horizontally to lower take-up film magazine 53.

The terms "horizontal" and "vertical" apply to the drawings herein. It is possible to orient the camera of this invention through a right angle, if desired, so that optical axis 9 is vertical. In such an instance the terms horizontal and vertical are interchanged herein.

Figure 2:
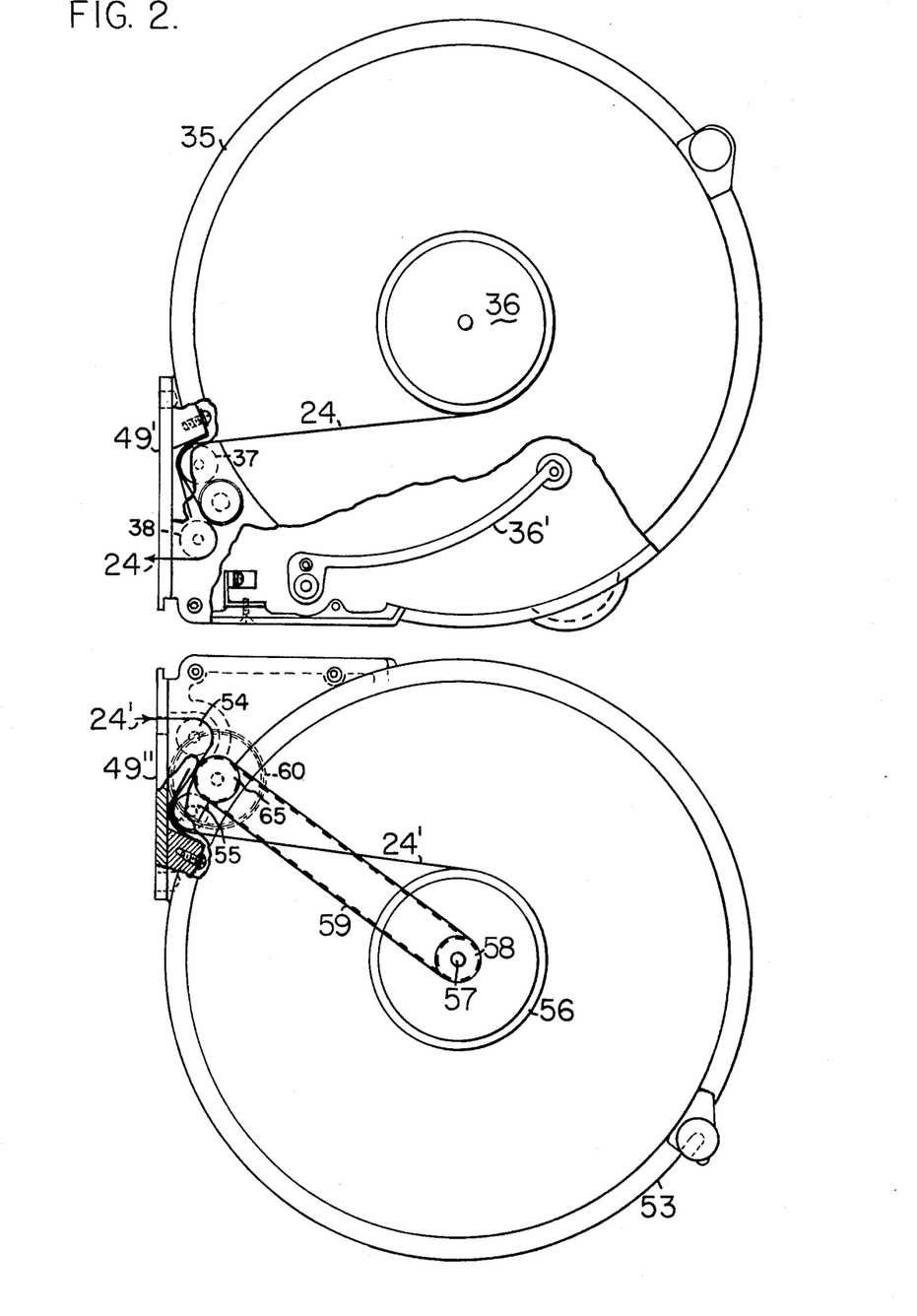
FIG. 2 is a side elevation of both the supply and the take-up magazines for the film; these attach to the camera of FIG. 1.

In general, the film path in take-up magazine 53 may be considered a mirror image of the film path in supply magazine 35. Film 24' passes from the camera proper into the take-up magazine via two light-baffle rollers 54 and 55.

Take-up torque is exerted upon spool 56 that is located centrally within magazine 53. The spool is carried upon shaft 57, which includes a known key for driving purposes. The shaft is driven by toothed belt pulley 58, having a diameter of approximately 2 centimeters (cm), and a toothed belt 59 to a take-up gear pulley 65 to which is attached take-up gear 60. This gear meshes with a similar gear 61 that is contained within camera case 1. A further gear 62, of reduced diameter, meshes with gear 61, and is mounted on take-up motor 63, which is controlled by the camera logic from a sensor at port 50.

While another combination is possible, the preferred combination of motors contemplates stepper motors for driving film belts 21, and shutter 11 (if a shutter is employed); and logic-controlled (such as full "on" and full "off") motors for capstan 40 and take-up 56. All motors are controlled by the logic for the camera, as subsequently detailed herein.

Recapitulating, capstan 40 feeds film 24 to first vacuum loop chamber 42, belts 21 intermittently translate the film for exposure while stationary, and take-up motor 60 provides tension on film 24' for removing it from second vacuum loop chamber 48.

Pressure-sensitive sensors are pneumatically connected to the several vacuum ports in the 43 and the 50 groups. The width of chambers 42 and 48 is only slightly greater than film 24 or 24'. Vacuum-introducing tube 34 is centrally located. With the positions of films 24 and 24' as shown, inner sensors 43" and 50' are at vacuum, while the other four sensors are at essentially atmospheric pressure. When the film loops are normal they are closely adjacent to ports 43 and 50, with these ports at atmospheric pressure.

The vacuum for the vacuum platen and the film loop chambers may be of the order of 40 cm of water.

Several entitles of the camera, including the film drive, the film feed and take-up, and the shutter (if used) are accurately correlated in operation by partially programmable logic that also accepts inputs from camera function sensors. This logic, 69 as a whole, is shown herein in FIGS. 6 thru 10.

Figure 6:
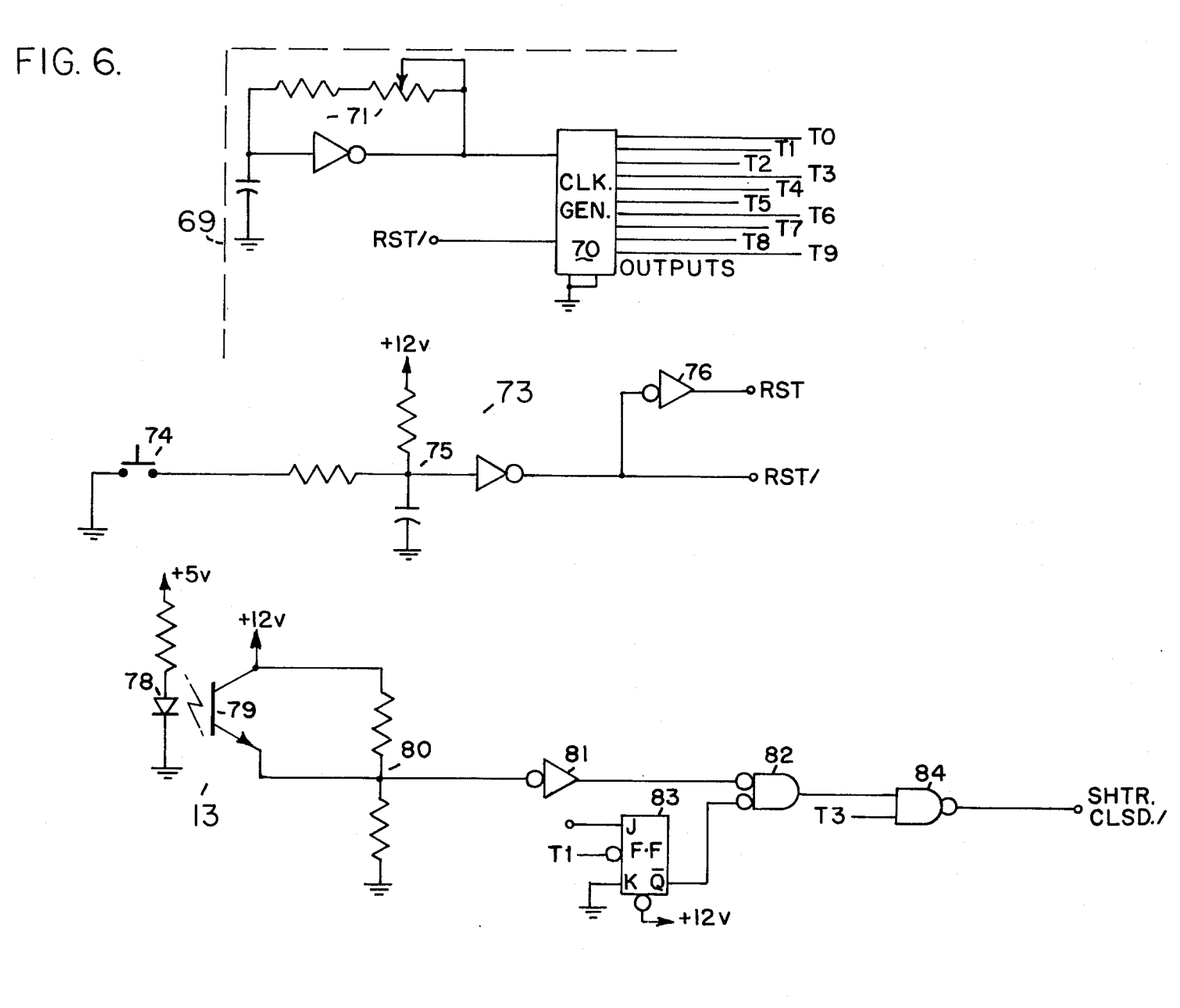
FIG. 6 shows the initial part of the schematic logic diagram of the logic that controls the actuation of the camera.

Referring to FIG. 6, the logic is synchronously operated throughout by control from a system clock generator 70. The generator per se may be a type CD4017 integrated circuit, having a clock input and a reset input, with outputs from T0 to T9.

A time constant circuit 71 is connected between ground and the clock input to allow adjustment of the pulse frequency of the generator.

System reset operator 73 allows manual reset of the system upon momentary switch 74 being closed, also reset upon an initial "power-up" condition; that is, when the system is started. The capacitor of pulse-forming circuit 75 is then discharged, giving an RST/output.

An output of opposite phase, RST, is obtained by interposing inverter 76 in a branch of the output line.

The circuit of shutter sensor 13 is also shown in FIG. 6. Photo light-emitting diode 78 is suitably activated by connection to a source of voltage, such as +5 volts d.c. through a resistor. Photo-sensitive transistor 79 is disposed opposite light-emitting diode 78. At such time as shutter 11 is closed, note FIG. 5, the shutter cuts off the light from photo-sensitive transistor 79 and a "shutter-closed" signal is generated. This is evidenced by a change in the voltage at the junction of powered voltage divider 80. This is passed on to inverter 81 and to one input of negative NAND gate 82.

The other input of gate 82 is fed from the $\overline{Q}$ output of flip-flop 83, of the C107 type; the inputs being an RST from the RST terminal of reset generator 73 and a T1 output from clock generator 70.

The output from negative NAND gate 82 passes through NAND gate 84. The output therefrom constitutes the "shutter closed" signal, for use further on in the logic circuits.

The several outputs at the right-hand side of FIG. 6 becomes inputs at subsequent figures that delineate the logic.

Figure 7:
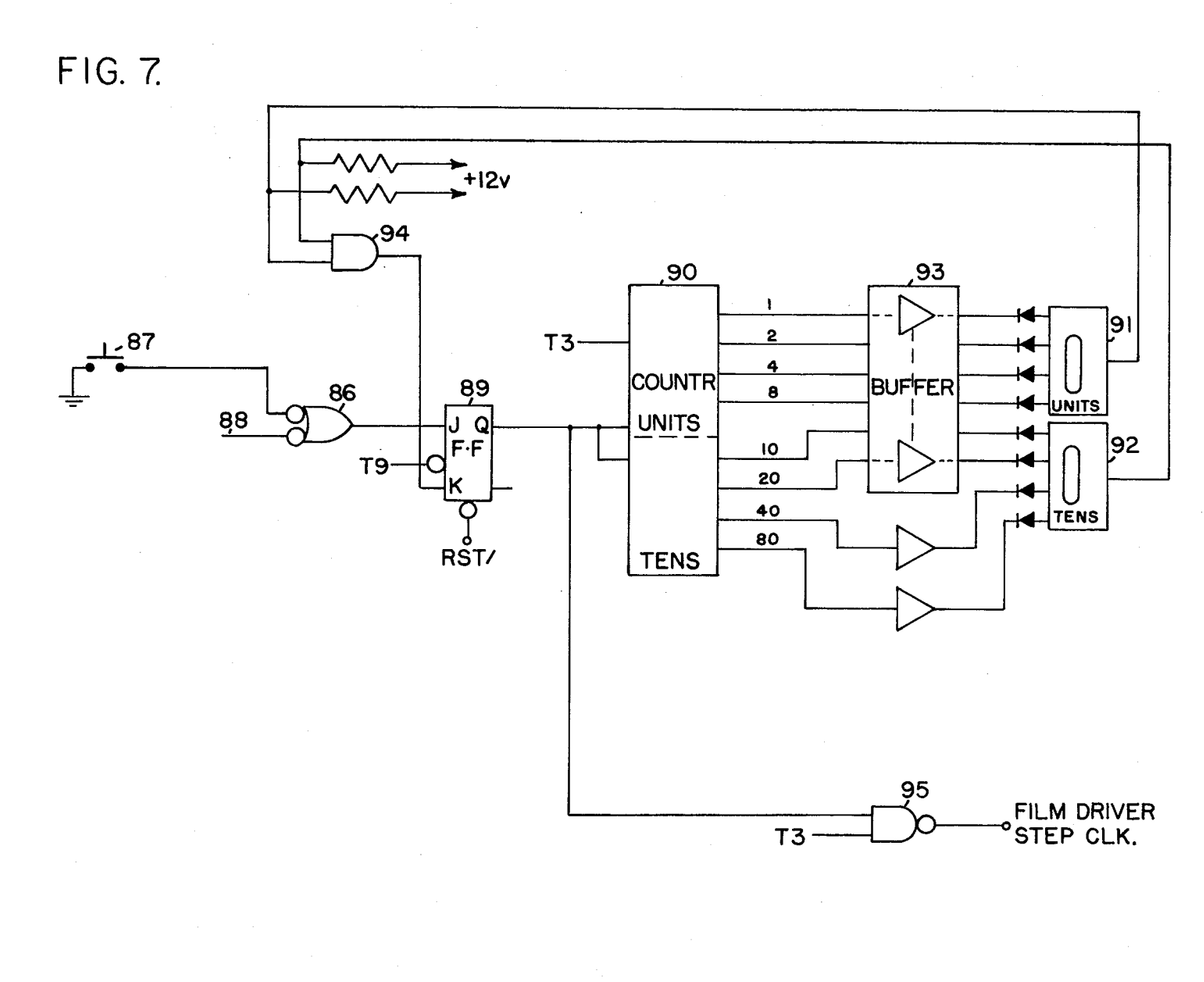
FIG. 7 shows the same for the belt pull-down of the film to be exposed.

FIG. 7 shows the logic for appropriately advancing the film by belts 21 of FIG. 3.

Negative NOR gate 86 accepts an actuating command from either of two inputs; i.e., from the momentary switch 87, having a "manual feed" designation, or from the "exposure complete/" signal 88.

The output of NOR gate 86 is connected to the "J" input of flip-flop 89, which latter is clocked by the T9 output of generator 70. The Q output enables type CD4518 BCD film pitch counter 90, which is clocked by generator output T3.

The counting total of counter 90 is programmed by manually setable switches 92 for the tens and 91 for the units. The switches may be of the thumbwheel type.

Four connections from the units switch have digital values of 1, 2, 4, 8. Gating diodes are interposed in each line to form a steering AND gate. From counter 90 the four lines enter a C902 buffer 93, and then pass through the diodes to corresponding units thumbwheel switch terminals.

The tens switch 92 has values 10, 20, 40, 80, and is similarly provided with gating diodes. From counter 90 four tens connections enter buffer 93, or individual equivalents, thence through the diodes to corresponding tens thumbwheel terminals.

The common terminal of each switch 91 and 92 connect as an input to AND gate 94; the output of which is connected to the K input of flip-flop 89.

In operation, assume that the switches are set for a value of 52; i.e., 2 on the units and 50 on the tens. When the counter reaches 52, the common output will go "high", because it is thus decoded. The resulting output from gate 94 to the K input of flip-flop 89 removes the enable from the Q output thereof to counter 90 and so the counter stops counting.

While flip-flop 89 was set it was enabling counter 90 to count with T3 pulses. From the Q output of this flip-flop an output is also taken and provides one input of NAND gate 95. The other input thereto is the constantly occurring T3 clock. Thus, an output of film driver step clock pulses is obtained for as many counts as the switches 91 and 92 have been set. These pulses drive belts 21 stepper drive motor 29 a corresponding number of steps.

Figure 8:
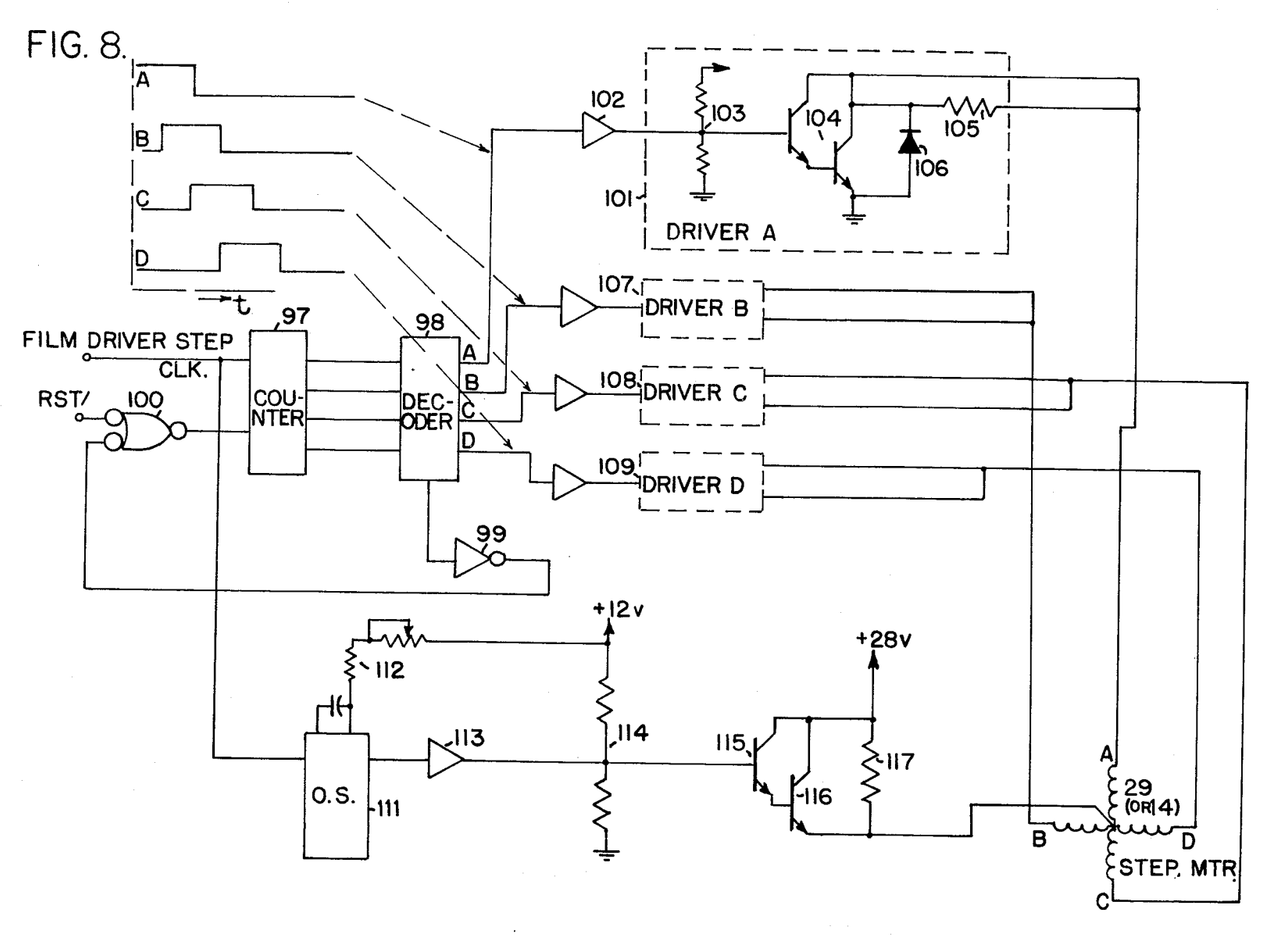
FIG. 8 shows the same for driver power for a stepper motor employed as in FIG. 7 or FIG. 9.

Such driving is accomplished through the intermediary of drivers, as shown in FIG. 8.

The film driver step clock output from NAND gate 95 in FIG. 7 enters C160 counter 97 of FIG. 8, providing the timed impetus that eventually becomes the driving power pulses for stepper motor 29.

Four outputs from counter 97 enter four inputs to two-phase PROM decoder 98. Four outputs from the decoder provide the four phases A, B, C, D. The timing of the rectangular pulses of these phases is given in a time-aligned showing in FIG. 8.

It is seen that phase A is first on. Before pulse A is over phase B pulse is on. For the latter half of pulse A both pulses A and B are on simultaneously. As soon as the A pulse goes off the phase C pulse starts. Thus, pulses B and C are on simultaneously. As soon as the B pulse goes off the phase D pulse starts. Thus, pulses C and D are on simultaneously. Then the sequence repeats.

A periodic output from decoder 98 passes through inverting amplifier 99 to one input of negative NOR gate 100. The other input is the RST/output of system reset generator 73. The output of gate 100 enters the reset terminal of counter 97.

Driver A per se, 101, accepts the A phase pulses from decoder 98 through buffer 102. Bias voltage divider 103 places a bias on the first base of the Darlington pair poer transistors 104. The dual collectors thereof are connected to the extremity of the A phase winding of four phase stepper-motor 29.

A suppression network is comprised of resistor 105 and diode 106. The resistor is connected between the second collector of the Darlington pair and the A phase winding of the motor. The diode is connected with the cathode to the same second collector and with the anode to ground. This circuit dissipates the otherwise high voltage spike originating in the phase A coil of the stepper-motor.

Driver B is a duplicate of driver A. It is connected between the phase B output of decoder 98 and the B phase winding of stepper-motor 29. Driver B is element 107.

The same is true of driver 108 with respect to C phase connections. The common terminal of the star-connected stepper-motor 29 windings is connected to a peak drive circuit.

The initial part of the peak drive circuit is comprised of a C123 one-shot 111. The input thereto is from the stepper-motor drive clock input to the whole driver circuit. Thus, the clock pulse triggers the one-shot at the same time that each phase of the drive through driver 101, 102, etc. occurs. The duration of the dwell of the one-shot is adjustable by means of RC circuit 112. The one-shot output passes through buffer 113, thence to voltage-divider 114 and the base of transistor 115.

The output from this transistor combines with that of transistor 116 to form a Darlington pair, which passes on the surge to the central common connection of the windings of stepper-motor 29.

Resistor 117 is the current holding resistor.

When the Darlington transistors 115 and 116 are "on" resistor 117 is shorted out and the full +28 volts is applied directly to the motor windings for the desired peak drive.

As soon as one-shot 111 returns to the non-triggered state the peak drive energization is removed. The stepper-motor has only partially completed its step, for example. 50% completed. Thereafter, the reduction of energization reduces heating of the motor and conserves energy.

Stepper-motor 29 drives belts 21 for translating the film to be exposed. Stepper-motor 14 drives shutter 11, when a shutter is employed in the camera. The driver circuit of FIG. 8 is the same for both stepper-motors.

However, the control logic for the shutter is different from that for the film drive. The shutter logic is given in FIG. 9.

Figure 9:
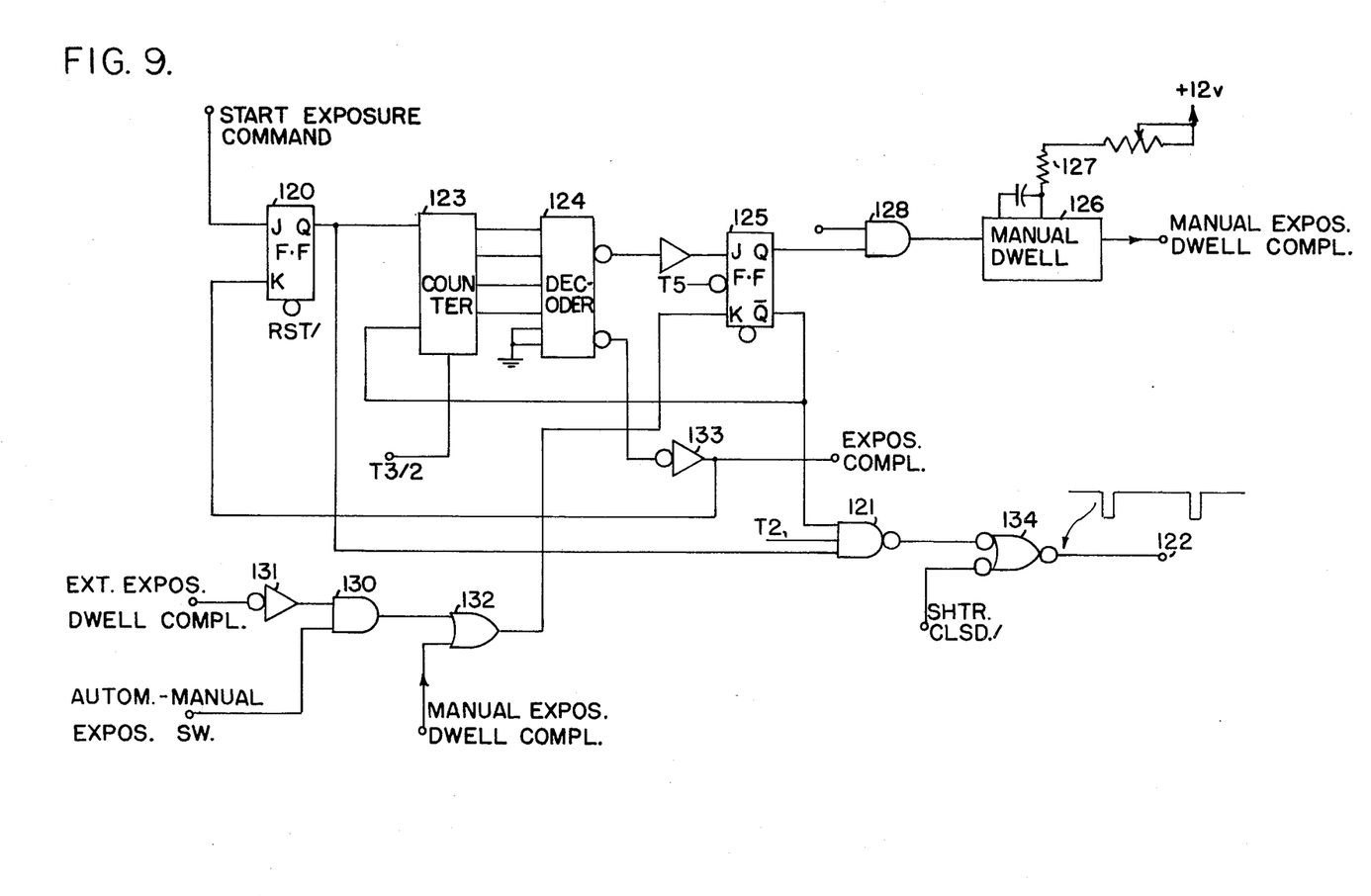
FIG. 9 shows the same for control of the shutter of the camera.

In FIG. 9, a start exposure command is received from external control means, of which the camera is a part; such as an automatic document handling apparatus. As example of the former is given in the U.S. Pat. No. 3,988,062, "Two-Sided Document Recorder", to Burton & Whitney, 1976.

The start exposure command enters the J terminal of J-K flip-flop 120. The Q output thereof enters NAND gate 121 and allows T2 pulses, also an input to the gate, to generate the shutter driver step clock at output 122.

The Q output of flip-flop 120 is also connected to C161 counter 123, which is enabled and starts to count. It is operated by clock T3/2, which causes a count of half the rate of the normal T3 clock count.

Four outputs from counter 123 enter four inputs of the C154 decoder 124. When the decoder reaches a decode of 6 on the counter, that output enters J-K flip-flop 125 at the J terminal, and sets that flip-flop. The Q terminal thus goes down to its low value and inhibits the T2 clock from going through NAND gate 121. This causes the stepping pulses to cease at output 122.

Provided that "manual" control is selected, the Q output of flip-flop 125 enables the C221 manual dwell control 126. This affords manually controlled exposure. That dwell period determines how long the shutter remains open at the mid-position of the rotation. This parameter may be adjusted by resistive-capacitive networks 127.

A normally closed manual expose switch is a second input to AND gate 128 that is interposed between the Q output of flip-flop 125 and the input of manual dwell control 126.

While the repetition rate for the shutter driver step clock pulses at output 122 may be any value required, a two millisecond interval with approximately a 20% duty cycle rectangular pulse is typical.

Ancillary elements are used in connection with the shutter logic. Two inputs enter the C08 AND gate 130; the external exposure dwell complete signal, and the "automatic" or "manual" selection exposure switch. The exposure dwell signal is fed through inverting amplifier or buffer 131.

The output of AND gate 130 is connected to one input of C32 OR gate 132. The other input is an externally determined manual expose dwell completed signal. The output of the OR gate enters the K terminal of flip-flop 125 to initiate a Q shift for terminating the conduction of AND gate 121 when the shutter is closed.

The full decode output of decoder 124 passes through inverting amplifier 133 to constitute an exposure complete output and also a K input to flip-flop 120. Both flip-flops 120 and 125 are reset by the RST/phase from FIG. 6. Also, the "shutter closed/" output from the photo-sensor of FIG. 6 is impressed as one input to a negative OR gate 134. On the power-up condition this insures that the shutter will be closed. The other input is the shutter driver step clock from NAND gate 121, as has been described.

Figure 10:
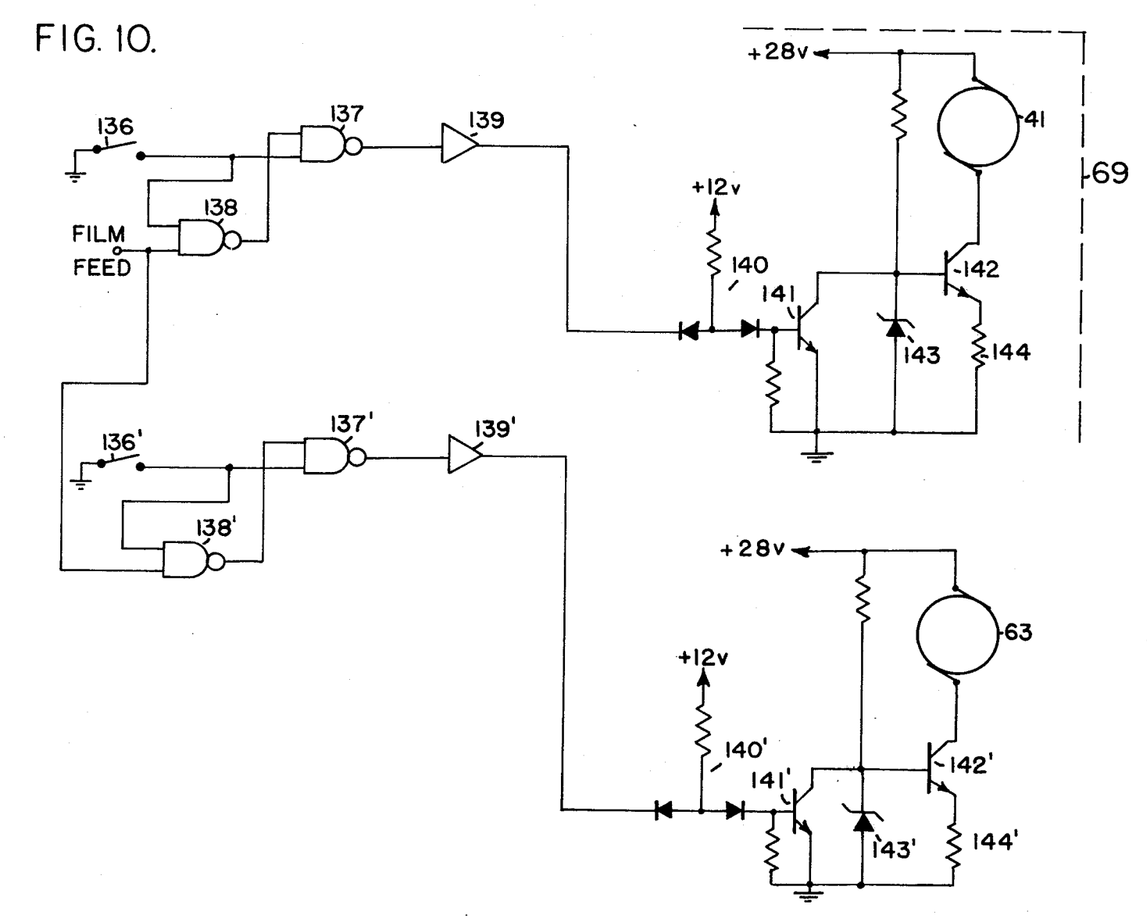
FIG. 10 shows the same for the control of motors for the supply and take-up magazines.

FIG. 10 shows the circuits for controlling the feed and take-up of film 24, 24'.

Switch 136 is a pressure sensor actuated at port 43 in FIG. 1. The normal position of film loop 24 is below that port. This results in atmospheric air pressure upon the switch, an open electrical circuit, and non-operation of capstan supply motor 41. As soon as the film loop shortens and exposes the port to vacuum, switch 136 is closed, the capstan motor operates, and more film is drawn from magazine 35.

In FIG. 10, NAND gate 137 has one input connected to switch 136. The second input comes from the output of NAND gate 138. Of the latter gate, one input is from switch 136 and the second input is from a film feed command, being an external manual control.

Gate 138 will pass an output when the film feed command input is present, if switch 136 is also closed, indicating the need for at least slightly more film in upper vacuum chamber 42. Typically, stepping pulses for advancing the belt-film according to FIG. 7 are simultaneously generated. This causes film 24 to pass through the camera, as for generating a blank leader at the front end of a reel of film.

The output from gate 137 passes through buffer 139 and into the power circuit of motor 41.

The first element thereof is a back-to-back diode resistive voltage supply 140 connected to the base of transistor 141; enhancing circuit stability. This transistor is in cascade connection with transistor 142, which is emitter-follower connected. The collector thereof is connected to one terminal of d.c. (commutator type) motor 41. The other terminal of the motor is connected to a source of power, such as plus 28 volts d.c. Zener diode 143 fixes the base to emitter voltage of transistor 142 at a fixed value, say 4.7 volts minus the base to emitter voltage drop of 0.6 volt, or 4.1 volts, net. This circuit arrangement causes resistor 144 to become an equivalent constant-current source. Thus, constant current flows through motor 41, and so this motor exerts a constant torque.

The circuit for the control of film take-up magazine motor 63 is the same as for supply motor 41. Thus, the elements thereof have been given prime (') designations, and the same explanation of the operation applies.

Face 49 on camera 1 accepts faces 49' and 49" on magazines 35 and 53, respectively, which are retained by a clamp fastening, not shown.

We claim:
1. A microfilm camera, comprising;
   (a) a stationary image-forming lens (3),
   (b) a constant-vacuum platen (19) disposed slightly behind the image-forming plane of said lens,
   (c) more than two closely adjacent coplanar flexible belts (21) traversing said vacuum platen at substantially said image-forming plane,
   (d) a drive pulley (22) to drive said belts by friction,
   (e) unexposed film supply means (35,40), having a first vacuum film-loop chamber (42) adjacent to said belts, with a first sensor (43) sensitive to the position of the first film loop,
   (f) exposed film take-up means (53,56) having a second vacuum film loop chamber (48) adjacent to said belts, with a second sensor (50) sensitive to the position of the second film loop,
   (g) means to direct said film to (44) and from (46) said belts for vacuum-adhesion drive of said film by said belts,
   (h) drive means (26,27,28) connected to said drive pulley,
   (i) logic means (69) to control the operation of the recited elements of said microfilm camera, connected to receive inputs from said first and second sensors, and connected to said unexposed film supply means, said exposed film take-up means, and said drive means,
   to expose film while that film and said belts are stationary, and to translate that film vacuum-adhered to said belts between exposures.

2. The microfilm camera of claim 1, which additionally includes;
   (a) a rotatable shutter (11) disposed to selectively interrupt the optical path from said lens (3),
   (b) a shutter sensor (13) connected to said logic means (69), and
   (c) actuating means connected to said shutter, and to said logic means for the control of said actuating means,
   to intermittently rotate said shutter for the exposure of said film while it is stationarily vacuum-adhered to said plural belts.

3. The microfilm camera of claim 2, in which;
   (a) said actuating means is a stepper-motor (14), and
   (b) the extent of rotation of said shutter is determined by the number of pulses fed to said stepper-motor from said logic means.

4. The microfilm camera of claim 1, in which;
   (a) said drive means includes a stepper-motor (29) connected to said drive pulley (22), and
   (b) a selectable extent of rotation of said drive pulley is determined by the number of pulses fed to the drive-pulley stepper-motor from said logic means.

5. The microfilm camera of claim 1, in which
   (a) said drive pulley (22) is disposed at one side of said lens, and
   (b) an additional, second, pulley (23) is disposed at the other side of the lens,
   with said closely adjacent coplanar belts passing between the pulleys in substantially parallel spaced-apart planes that are substantially perpendicular to the optic axis of said lens.

6. The microfilm camera of claim 5, which additionally includes;
   (a) a shaft (30) concentric with said second pulley (23), and
   (b) plural resilient means (32,32') bearing upon said shaft to urge said shaft away from said drive pulley (22)
   so as to maintain said closely adjacent coplanar belts (21) taut.

7. The microfilm camera of claim 6, which additionally includes;
   (a) further resilient means (32") bearing upon said shaft (30)
   to urge it axially to a fixed location in the direction transverse to the direction of motion of said plural belts (21).

8. The microfilm camera of claim 1, in which;
   (a) the plurality of said closely adjacent coplanar belts (21) is four, and
   (b) said drive pulley has a crown for each of said belts, to align each of said belts in uniformly spaced adjacent paths, one to the other.

9. The microfilm camera of claim 1, in which said unexposed film supply means additionally includes;

(a) a capstan (40) engaging said unexposed film to feed it to said first vacuum film-loop chamber (42), and (b) a logic-controlled full-on, full-off motor (41) connected to rotate said capstan.

10. The microfilm camera of claim 1, in which said means to direct said film to and from said closely adjacent coplanar belts additionally includes;

(a) a hard substance (45,47) disposed at one edge of said film, and (b) an edge roller (44,46) oppositely disposed with respect to a said hard substance to retain said film in a constant transverse path.

11. The microfilm camera of claim 1, which additionally includes;

(a) a planar film keeper plate (53) disposed in a plane parallel to the plane of the path of said film (24), and spaced on the lens (3) side of said image-forming plane from said film, said film keeper plate being substantially coextensive with the portion of said closely adjacent coplanar belts that are adjacent to said image-forming plane.

12. The microfilm camera of claim 1, in which said logic means (69) comprises;

(a) a clock generator (70) having plural outputs, (b) a pitch control counter (90) connected to said clock generator for actuation thereby, (c) a plural phase motor driver (97,98,101) connected to said pitch control counter for actuation thereby, and (d) a plural phase stepper-motor (29) connected to said motor driver for energization thereby;

said stepper-motor mechanically connected to said drive means (26,27,28) for the actuation thereof.

13. The microfilm camera of claim 12, in which;
(a) said plural phase motor driver has N phases, and
(b) said plural phase stepper motor has 2N phases.

14. The microfilm camera of claim 13, in which;

(a) the arithmetic value of N is two.

15. The microfilm camera of claim 12, which additionally includes;

(a) plural switch means (91,92) connected to said pitch control counter (90), to fix the number of counts said counter shall count after being enabled.

16. The microfilm camera of claim 12, in which said plural phase motor driver comprises;

(a) a counter (97) having plural outputs, (b) a decoder (98) connected to the plural outputs of said counter, said decoder having plural outputs, and (c) plural power drivers, individually connected to one of the plural outputs of said decoder and individually connected to one of the plural phases of said stepper motor (29).

17. The microfilm camera of claim 12, which additionally includes;

(a) a shutter control counter (123) connected to said clock generator for actuation thereby, (b) a decoder (124) plurally connected to said shutter control counter, (c) setable means (126) to control the number of counts executed by said shutter control counter connected thereto, (d) a plural phase shutter driver (101) connected to said decoder for actuation thereby, and (e) a plural phase shutter stepper-motor (14) connected to said shutter motor driver for energization thereby, said shutter stepper-motor connected to said shutter (11) for the rotation thereof.

18. The microfilm camera of claim 17, in which;
(a) said plural phase shutter motor driver has N phases, and
(b) said plural phase shutter stepper-motor has 2N phases.

* * * * *